US012752722B2

(12) United States Patent
Yamane

(10) Patent No.: US 12,752,722 B2
(45) Date of Patent: Oct. 6, 2026

(54) VEHICLE-MOUNTED DEVICE, PROGRAM, AND INFORMATION PROCESSING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Takuma Yamane, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 49 days.

(21) Appl. No.: 18/848,432

(22) PCT Filed: Mar. 13, 2023

(86) PCT No.: PCT/JP2023/009484

§ 371 (c)(1),
(2) Date: Sep. 18, 2024

(87) PCT Pub. No.: WO2023/182021

PCT Pub. Date: Sep. 28, 2023

(65) Prior Publication Data

US 2025/0242768 A1 Jul. 31, 2025

(30) Foreign Application Priority Data

Mar. 24, 2022 (JP) ................................ 2022-048726

(51) Int. Cl.
*B60R 16/023* (2006.01)

(52) U.S. Cl.
CPC ................................ *B60R 16/0232* (2013.01)

(58) Field of Classification Search
CPC ... B60R 16/0232; B60R 16/02; B60R 16/023; B60R 16/03; B60J 5/00; E05B 81/04; E05B 81/54; E05B 81/80
See application file for complete search history.

(56) References Cited

U.S. PATENT DOCUMENTS

| | | | | |
|---|---|---|---|---|
| 2019/0265966 | A1 | 8/2019 | Shimomura | |
| 2023/0294621 | A1 * | 9/2023 | Geula | B60R 16/033 |

FOREIGN PATENT DOCUMENTS

| | | | |
|---|---|---|---|
| JP | 2009-132366 | A | 6/2009 |
| JP | 2010-137656 | A | 6/2010 |
| JP | 2012-158272 | A | 8/2012 |
| JP | 2017-224926 | A | 12/2017 |

OTHER PUBLICATIONS

International Search Report, Application No. PCT/JP2023/009484, mailed Apr. 25, 2023. ISA/Japan Patent Office.

* cited by examiner

*Primary Examiner* — Brian P Sweeney
(74) *Attorney, Agent, or Firm* — Brooks Kushman P.C.

(57) ABSTRACT

A vehicle-mounted device is communicably connected to a vehicle-mounted ECU that controls a vehicle-mounted load mounted in the vehicle, and receives supply of power from a power source device mounted in the vehicle. The vehicle-mounted device includes a control unit that controls power supply to the vehicle-mounted ECU. The control unit takes over control to be performed by the vehicle-mounted ECU on the vehicle-mounted load, according to the state of the vehicle-mounted ECU.

9 Claims, 6 Drawing Sheets

Legend
A= Number of instances of abnormality detection and number of instances of takeover control match each other?

VEHICLE-MOUNTED DEVICE, PROGRAM, AND INFORMATION PROCESSING METHOD

CROSS-REFERENCE TO RELATED APPLICATIONS

This application is the U.S. national stage of PCT/JP2023/009484 filed on Mar. 13, 2023, which claims priority of Japanese Patent Application No. JP 2022-048726 filed on Mar. 24, 2022, the contents of which are incorporated herein.

TECHNICAL FIELD

The present disclosure relates to a vehicle-mounted device, a program, and an information processing method.

BACKGROUND

A vehicle is equipped with a body ECU, which is a vehicle-mounted ECU that performs overall control of body-related devices such as a wiper drive device, interior and exterior lighting devices, door lock devices, and power windows (e.g., JP 2017-224926A). The wiper drive device of JP 2017-224926A includes a vehicle-mounted ECU (body ECU), and is driven by a control program applied to the vehicle-mounted ECU.

In the drive device and vehicle-mounted ECU of JP 2017-224926A, which are to be mounted in a vehicle, no consideration is given to efficiently performing control related to power source management and the like for each of the body-related devices (vehicle-mounted loads).

An object of the present disclosure is to provide a vehicle-mounted device and the like that can efficiently control a vehicle-mounted load.

SUMMARY

A vehicle-mounted device according to an aspect of the present disclosure is vehicle-mounted device that is communicably connected to a vehicle-mounted ECU configured to perform control of a vehicle-mounted load to be mounted in a vehicle, the vehicle-mounted device receiving supply of power from a power source device mounted in the vehicle, including a control unit configured to control power supply to the vehicle-mounted ECU, in which the control unit takes over control to be performed by the vehicle-mounted ECU on the vehicle-mounted load, according to a state of the vehicle-mounted ECU.

Advantageous Effects

According to one aspect of the present disclosure, it is possible to provide a vehicle-mounted device or the like that efficiently controls a vehicle-mounted load.

BRIEF DESCRIPTION OF DRAWINGS

FIG. 3 is an explanatory diagram illustrating a flow (sequence) of processing performed by a vehicle-mounted device, a vehicle-mounted ECU, and the like.

DETAILED DESCRIPTION OF PREFERRED EMBODIMENTS

Figure 1:
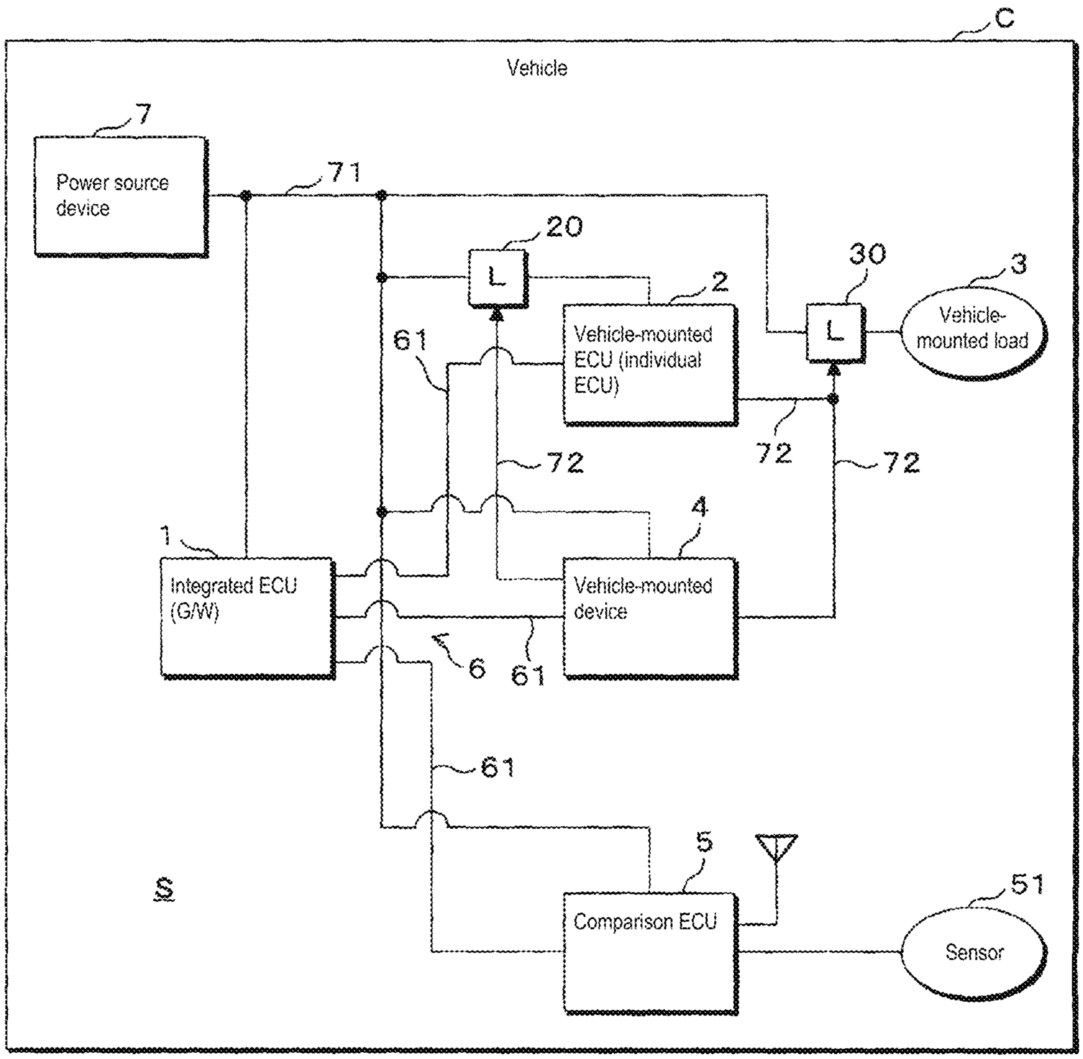
FIG. 1 is a schematic diagram illustrating a system configuration of a vehicle-mounted system (power source management system) according to a first embodiment.

First, embodiments of the present disclosure will be listed and described. At least some of the embodiments described below may be combined as appropriate. A vehicle-mounted device according to an aspect of the present disclosure is a vehicle-mounted device that is communicably connected to a vehicle-mounted ECU configured to perform control of a vehicle-mounted load to be mounted in a vehicle, the vehicle-mounted device receiving supply of power from a power source device mounted in the vehicle, including a control unit configured to control power supply to the vehicle-mounted ECU, in which the control unit takes over control to be performed by the vehicle-mounted ECU on the vehicle-mounted load, according to a state of the vehicle-mounted ECU.

In this aspect, the vehicle-mounted device is communicably connected to the vehicle-mounted ECU (individual ECU) that controls the vehicle-mounted load, and functions as a power source management ECU that controls power supply to the vehicle-mounted ECU. The vehicle-mounted device and the vehicle-mounted ECU may be indirectly connected to be able to communicate with each other, for example, via a relay device such as a CAN gateway, or the vehicle-mounted device and the vehicle-mounted ECU may be connected to the same communication line such as a CAN bus and be directly connected to be able to communicate with each other. The vehicle-mounted device receives supply of power from the power source device mounted in the vehicle, and therefore remains started up even when the power source device is not supplying power to the vehicle-mounted ECU, that is, when the vehicle-mounted ECU is powered off. The vehicle-mounted device takes over control to be performed by the vehicle-mounted ECU on the vehicle-mounted load according to the state of the vehicle-mounted ECU, and therefore, even if the vehicle-mounted ECU is powered off, for example, the vehicle-mounted device takes over the control of the vehicle-mounted load for the vehicle-mounted ECU. This enables redundant control of the vehicle-mounted load, and allows efficient control of the vehicle-mounted load. In particular, if the vehicle-mounted load requires immediacy or quick response, such as a door lock mechanism (door lock motor), and the vehicle-mounted ECU is powered off when a request to drive the door lock motor is made, a delay will occur before driving begins due to the time required to start up the vehicle-mounted ECU (start-up time). If a delay occurs in controlling a vehicle-mounted load that requires immediacy, the time required from the drive request to the start of driving (response time) increases. In response to this, the control unit of the vehicle-mounted device that receives power from the power source device takes over the control to be performed by the vehicle-mounted ECU on the vehicle-mounted load, according to the state of the vehicle-mounted ECU, such as a powered-off state. Accordingly, it is possible to ensure the immediacy and the like required for control of the vehicle-mounted load without being influenced by a delay caused by the start-up time of the vehicle-mounted ECU.

In a vehicle-mounted device according to an aspect of the present disclosure, the control unit acquires a drive request for the vehicle-mounted load, and takes over the control to be performed by the vehicle-mounted ECU on the vehicle-mounted load, in response to the acquired drive request.

In this aspect, when a drive request for the vehicle-mounted load is made, for example, by detection performed by a sensor mounted in the vehicle, by operating a switch, or the like, the control unit of the vehicle-mounted device takes over the control to be performed by the vehicle-mounted ECU on the vehicle load in response to the drive request, thereby enabling efficient control of the vehicle-mounted load.

In a vehicle-mounted device according to an aspect of the present disclosure, the power source device and the vehicle-mounted ECU are connected to each other via a first relay, the power source device and the vehicle-mounted load are connected to each other via a second relay subjected to opening and closing control by the vehicle-mounted ECU, and the control unit performs control of power supply to the vehicle-mounted ECU by performing opening and closing control of the first relay, and takes over the control to be performed by the vehicle-mounted ECU on the vehicle-mounted load by performing opening and closing control of the second relay.

In this embodiment, the vehicle-mounted load is subjected to drive control achieved by driving, stopping, and the like, by opening and closing (switching on or off) the second relay provided on the electric wire extending from the power source device. Since the opening and closing control of the second relay is performed not only by the vehicle-mounted ECU but also by the vehicle-mounted device (control unit), the processing mode related to the control of the vehicle-mounted load can be made the same for the vehicle-mounted ECU and the vehicle-mounted device, and the control mechanism for controlling the vehicle-mounted load can be simplified.

In a vehicle-mounted device according to an aspect of the present disclosure, control lines that are made redundant due to respectively extending from the vehicle-mounted ECU and the vehicle-mounted device are connected to the second relay.

In this embodiment, the control line extending from the vehicle-mounted ECU and the control line extending from the vehicle-mounted device are connected to the second relay for performing drive control of the vehicle-mounted load. That is, by connecting two systems of control lines to the second relay, a redundant connection configuration can be formed. As a result, even if one of the control lines should become disconnected, the opening and closing control of the second relay can be performed using the other control line.

In a vehicle-mounted device according to an aspect of the present disclosure, the state of the vehicle-mounted ECU includes a non-started-up state, a starting-up state, and a started-up state, and the control unit takes over the control to be performed by the vehicle-mounted ECU on the vehicle-mounted load when the state of the vehicle-mounted ECU is the non-started-up state or the starting-up state.

In this aspect, power is supplied from the power source device to the vehicle-mounted ECU via the first relay, and the opening and closing control of the first relay is performed by the vehicle-mounted device functioning as the power source management ECU. When the first relay is open (off), power is not supplied to the vehicle-mounted ECU (the vehicle-mounted ECU is powered off), and the vehicle-mounted ECU is in a stopped state (non-started-up state) in which it is not yet started up. When the vehicle-mounted device closes (switches on) the first relay, power is supplied to the vehicle-mounted ECU (the vehicle-mounted ECU is powered on), and the vehicle-mounted ECU starts start-up processing such as initialization and transitions to a starting-up state. When the vehicle-mounted ECU completes start-up processing such as initialization, the vehicle-mounted ECU transitions from the starting-up state to the started-up state. The vehicle-mounted ECU in the started-up state starts the opening and closing control of the second relay, that is, the drive control of the vehicle-mounted load. When the vehicle-mounted ECU completes the start-up processing, the vehicle-mounted ECU starts, for example, CAN communication (transmission of a CAN message), and therefore the vehicle-mounted device can detect (recognize) that the vehicle-mounted ECU has transitioned to the started-up state by receiving the first CAN message from the vehicle-mounted ECU after the first relay is closed (switched on). Alternatively, the vehicle-mounted device may recognize that the vehicle-mounted ECU has transitioned to the started-up state when a predetermined time equivalent to the start-up time of the vehicle-mounted ECU has elapsed after the first relay is closed (switched on). The control unit of the vehicle-mounted device can efficiently detect (specify) the state of the vehicle-mounted ECU, that is, whether the vehicle-mounted ECU is in a non-started-up state, a starting-up state, or a started-up state, based on the open/closed state of the first relay, and data, a signal, or the like first received from the vehicle-mounted ECU after the first relay is closed (switched on). The control unit of the vehicle-mounted device may store the detected state of the vehicle-mounted ECU or history information relating to state transition in the storage unit. The control unit of the vehicle-mounted device takes over the control to be performed by the vehicle-mounted ECU on the vehicle-mounted load when the vehicle-mounted ECU is in a non-started-up or a starting-up state according to the detected state of the vehicle-mounted ECU, that is, the control unit of the vehicle-mounted device performs processing to take over for the vehicle-mounted ECU during a period when the vehicle-mounted ECU cannot perform control of the vehicle-mounted load (second relay). As a result, when the vehicle-mounted ECU is in the started-up state, the control unit of the vehicle-mounted device does not perform control of the vehicle-mounted load, thereby preventing the drive control of the vehicle load, that is, the opening and closing control of the second relay, from being performed redundantly by the vehicle-mounted device and the vehicle-mounted ECU. Accordingly, it is possible to reliably avoid a conflict between the controls performed by the vehicle-mounted device and the vehicle-mounted ECU on the vehicle-mounted load.

In a vehicle-mounted device according to an aspect of the present disclosure, if the control unit acquires a permission notification permitting takeover of control of the vehicle-mounted load from the vehicle-mounted ECU, the control unit takes over the control to be performed by the vehicle-mounted ECU on the vehicle-mounted load.

In this aspect, for example, before power supply to the vehicle-mounted ECU is stopped (before the vehicle-mounted ECU is powered off), the vehicle-mounted ECU outputs (transmits) a permission notification that permits takeover of control of the vehicle-mounted load to the vehicle-mounted device. The permission notification may list one or more vehicle-mounted loads connected to the vehicle-mounted ECU, and may include information such as a flag value indicating whether or not takeover is permitted for each vehicle-mounted load (1: takeover permitted, 0: takeover not permitted). The control unit of the vehicle-mounted device stores the permission notification acquired (received) from the vehicle-mounted ECU in the storage unit. When the control unit of the vehicle-mounted device takes over the control to be performed by the vehicle-mounted ECU on the vehicle-mounted load, the control unit refers to the storage unit and performs the takeover processing only when a permission notification is acquired from the vehicle-mounted ECU. That is, if the control unit of the vehicle-mounted device does not acquire a permission notification from the vehicle-mounted ECU in advance, the control unit does not perform the takeover processing. Alternatively, the control unit of the vehicle-mounted device may perform the takeover processing only for a vehicle-mounted load for which information indicating that takeover is permitted has been given in the acquired permission notification. This allows the vehicle-mounted ECU to set any of the vehicle-mounted loads to be excluded from takeover processing performed by the vehicle-mounted device if a vehicle-mounted load connected to the vehicle-mounted ECU has failed, if takeover processing for a vehicle-mounted load is not appropriate from a security standpoint, or the like. Accordingly, it is possible to prevent the vehicle-mounted device from taking over the control to be performed by the vehicle-mounted ECU on a vehicle-mounted load that has failed or for which takeover processing is not appropriate due to other factors such as security.

In a vehicle-mounted device according to an aspect of the present disclosure, when the control unit takes over the control to be performed by the vehicle-mounted ECU on the vehicle-mounted load, the control unit outputs information indicating that takeover has been performed to the vehicle-mounted ECU.

In this embodiment, when the control unit of the vehicle-mounted device takes over the control to be performed by the vehicle-mounted ECU on the vehicle-mounted load, the control unit outputs, to the vehicle-mounted ECU, history information (takeover record information) based on, for example, the number of instances of takeover (number of instances of takeover control) or time information (time stamp) indicating the date and time of the takeover. The vehicle-mounted ECU can keep track of the number of instances of takeover control performed by the vehicle-mounted device up to the present time or within a predetermined period by acquiring the takeover record information output from the vehicle-mounted device. When the vehicle-mounted device performs takeover processing, the vehicle-mounted load is driven even though the vehicle-mounted ECU is not performing drive control. When the vehicle-mounted load is driven through such takeover processing, the vehicle-mounted ECU performs abnormality detection on the vehicle-mounted load, but the abnormality detection is substantially equivalent to an erroneous detection. In response to this, the vehicle-mounted ECU can determine whether or not a true abnormality has occurred in the vehicle-mounted load by comparing the takeover record information (number of instances of takeover control) output from the vehicle-mounted device and the number of instances of detecting an abnormality (number of instances of abnormality detection). For example, the vehicle-mounted ECU may determine that the vehicle-mounted load is normal if the number of instances of takeover control is the same as the number of instances of abnormality detection, and may determine that the vehicle-mounted load is abnormal if the number of instances of takeover control is different from the number of instances of abnormality detection.

In a vehicle-mounted device according to an aspect of the present disclosure, the state of the vehicle-mounted ECU includes a failed state, and the control unit takes over the control to be performed by the vehicle-mounted ECU on the vehicle-mounted load when the state of the vehicle-mounted ECU is the failed state.

In this embodiment, the control unit of the vehicle-mounted device communicates with the vehicle-mounted ECU or with the integrated ECU or the like having a relay function, and thereby acquires a notification (failure notification) indicating that the vehicle-mounted ECU is in a failed state, and stores the notification in a storage unit. When the control unit of the vehicle-mounted device acquires the failure notification, the control unit determines that the vehicle-mounted ECU is in a failed state and takes over the control performed by the vehicle-mounted ECU on the vehicle-mounted load, thereby achieving redundancy (fail-safe) of control of the vehicle-mounted load. Functional safety requirements according to, for example, ASIL (Automotive Safety Integrity Level) or the like are imposed on each of the vehicle-mounted loads connected to the vehicle-mounted ECU. Even if the vehicle-mounted ECU fails, the vehicle-mounted device can take over for the failed vehicle-mounted ECU and perform control of the vehicle-mounted load, thereby ensuring failure tolerance in overall vehicle control.

In a vehicle-mounted device according to an aspect of the present disclosure, an integrated ECU configured to perform overall control of the vehicle is mounted in the vehicle, and the vehicle-mounted device is configured as a functional part of the vehicle-mounted ECU.

In this embodiment, the integrated ECU is communicably connected to a plurality of vehicle-mounted ECUs, and performs overall control of the vehicle based on information output from each of the vehicle-mounted ECUs. The integrated ECU may further be communicably connected to a comparison ECU that is connected to a touch sensor or the like, and may output a control signal generated based on information (sensor detection value) output from the comparison ECU to each vehicle-mounted ECU. By including a vehicle-mounted device that controls the power supply to the vehicle-mounted ECUs and takes over the control to be performed by the vehicle-mounted ECUs on the vehicle-mounted loads in the integrated ECU, that is, by configuring the vehicle-mounted device as one functional part of the integrated ECU, the number of components mounted in the vehicle can be reduced. If the integrated ECU includes a plurality of in-vehicle communication units (such as CAN transceivers) and performs relay processing of data transmitted and received between the vehicle-mounted ECUs connected to these in-vehicle communication units, the integrated ECU can efficiently keep track of the states of the vehicle-mounted ECUs based on whether or not there is data transmitted from these vehicle-mounted ECUs, or the like. This allows the vehicle-mounted device configured as (included as) a functional part of the integrated ECU to efficiently perform proxy processing according to the states of the vehicle-mounted ECUs.

In a vehicle-mounted device according to an aspect of the present disclosure, power is constantly supplied from the power source device.

In this embodiment, the vehicle-mounted device constantly receives supply of power from a power source device such as a battery mounted in the vehicle, and therefore constantly receives supply of power from a so-called +B power supply. As a result, even when the vehicle is stopped (IG off state), power is supplied to the vehicle-mounted device from the power source device, and the vehicle-mounted device can remain in a state in which it has been started up (started-up state), and can perform processing on input signals without incurring a delay required for start-up such as initialization processing. By configuring the vehicle-mounted device to constantly receive supply of power from the power source device in this manner, the cumulative time during which the vehicle-mounted device is started up is longer than the cumulative time during which the vehicle-mounted ECU is started up. When the vehicle-mounted device constantly receives supply of power from the power source device, while the vehicle is stopped (IG off state), the vehicle-mounted device may transition to a power saving mode in which power consumption is reduced, for example, by reducing the operating clock (frequency) of the control unit.

In an information processing method according to an aspect of the present disclosure, a computer that is communicably connected to a vehicle-mounted ECU configured to perform control of a vehicle-mounted load to be mounted in a vehicle, and that receives supply of power from a power source device mounted in the vehicle, executes the following processing: executing processing related to control of power supply to the vehicle-mounted ECU; and taking over control to be performed by the vehicle-mounted ECU on the vehicle-mounted load according to a state of the vehicle-mounted ECU.

In this aspect, it is possible to provide an information processing method for causing a computer to function as a vehicle-mounted device that can efficiently control a vehicle-mounted load.

With a program according to an aspect of the present disclosure, a computer that is communicably connected to a vehicle-mounted ECU configured to perform control of a vehicle-mounted load to be mounted in a vehicle, and that receives supply of power from a power source device mounted in the vehicle, executes the following processing: executing processing related to control of power supply to the vehicle-mounted ECU; and taking over control to be performed by the vehicle-mounted ECU on the vehicle-mounted load according to a state of the vehicle-mounted ECU.

In this aspect, the computer can function as a vehicle-mounted device that can efficiently control the vehicle-mounted load.

The present disclosure will be specifically described with reference to drawings showing the embodiments thereof. A vehicle-mounted system S according to an embodiment of the present disclosure will be described below with reference to the drawings. It should be noted that the present disclosure is not limited to these examples, but is indicated by the claims, and all modifications within the scope and meaning equivalent to the claims are intended to be encompassed therein.

First Embodiment

Figure 2:
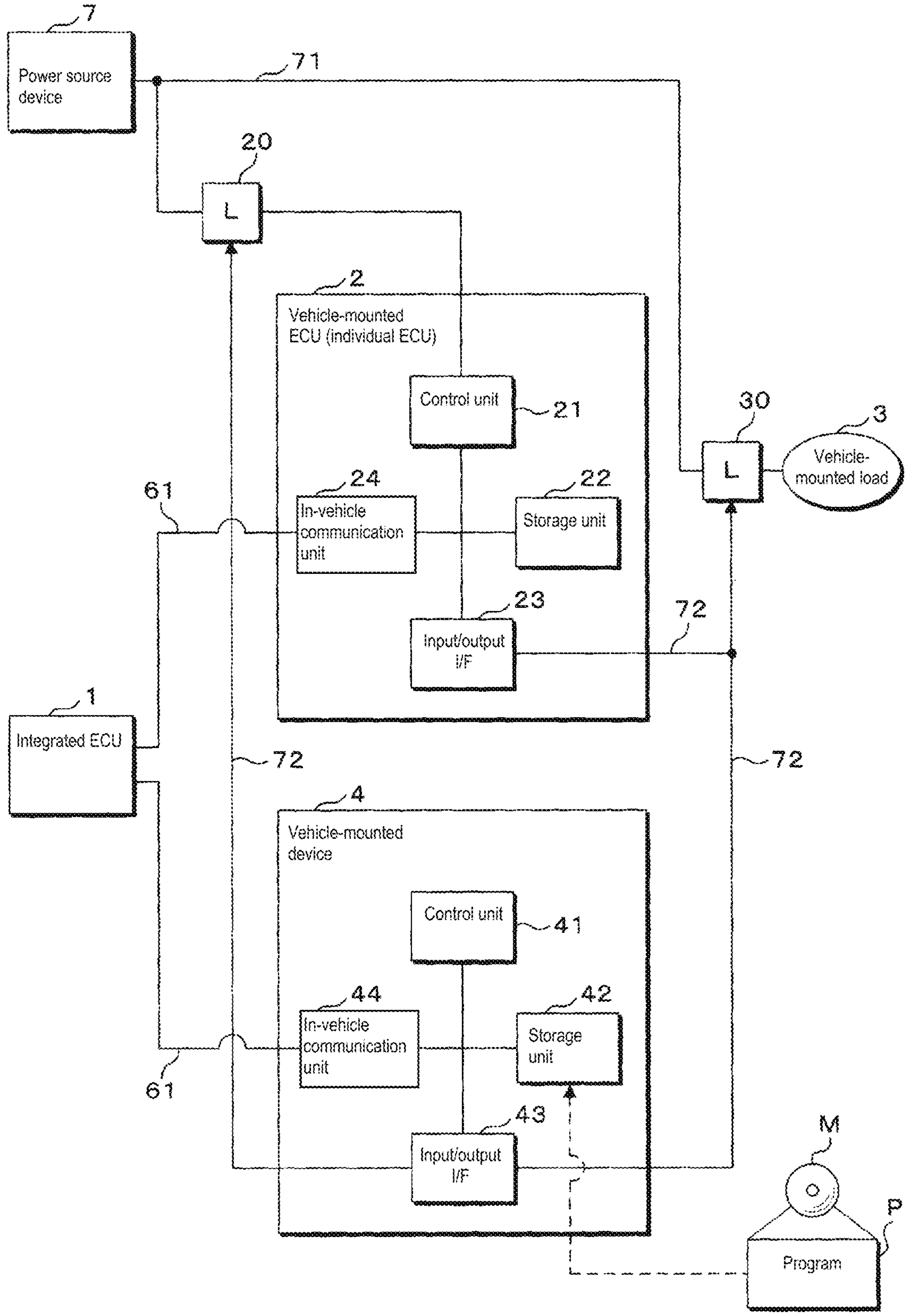
FIG. 2 is a block diagram illustrating an internal configuration of a vehicle-mounted device (power source management ECU).

Hereinafter, an embodiment will be described with reference to the drawings. FIG. 1 is a schematic diagram illustrating a system configuration of a vehicle-mounted system S (power source management system) according to a first embodiment. FIG. 2 is a block diagram illustrating an internal configuration of a vehicle-mounted device 4 (power source management ECU). The vehicle-mounted system S may include, as its main device, the vehicle-mounted device 4 (power source management ECU) that performs control (power supply control) relating to power source management of one or more vehicle-mounted ECUs 2 (individual ECUs) mounted in a vehicle C, and the vehicle-mounted system S may include an integrated ECU 1 and a comparison ECU 5 that are communicably connected to the vehicle-mounted device 4.

The integrated ECU 1, the comparison ECU 5, the vehicle-mounted device 4, and the vehicle-mounted ECU 2 (individual ECU) are connected to each other so as to be able to communicate with each other via communication lines 61 such as a CAN bus. The plurality of bus-like communication lines 61 constitute a star-shaped vehicle-mounted network 6 centered on the integrated ECU 1 having a relay function.

An electric wire 71 extending from a power source device 7 is connected to the integrated ECU 1, the comparison ECU 5, the vehicle-mounted device 4, the vehicle-mounted ECU 2, and the vehicle-mounted load 3, and power is supplied from the power source device 7 via the electric wire 71. The integrated ECU 1, the comparison ECU 5, and the vehicle-mounted device 4 are constantly supplied with power from the power source device 7.

The electric wire 71 extending from the power source device 7 to the vehicle-mounted ECU 2 is provided with a first relay 20 that switches between supplying and stopping (cutting off) the power. The electric wire 71 extending from the power source device 7 to the vehicle-mounted load 3 is provided with a second relay 30 that switches between supplying and stopping (cutting off) the power. The first relay 20 and the second relay 30 may be, for example, semiconductor switches such as FETs (Field Effect Transistors) or mechanical relays. If the first relay 20 and the second relay 30 are FETs, control lines 72 extending from the vehicle-mounted ECU 2 and the vehicle-mounted device 4 are connected to the gate terminals of the FETs.

The vehicle-mounted ECU 2 controls a vehicle-mounted load 3 mounted in the vehicle C, and performs opening and closing control of the second relay 30 that supplies and cuts off power to the vehicle-mounted load 3. In this way, the vehicle-mounted ECU 2 functions as an individual ECU responsible for drive control of one or more vehicle-mounted loads 3. A control line 72 extends from the vehicle-mounted ECU 2 to the second relay 30, and a signal for controlling the opening and closing of the second relay 30 is transmitted through the control line 72.

The vehicle-mounted device 4 functions as a power source management ECU by controlling the opening and closing of the first relay 20 that supplies and cuts off power to the plurality of vehicle-mounted ECUs 2 in response to a control signal from the integrated ECU 1, for example. A control line 72 extends from the vehicle-mounted device 4 to the first relay 20, and a signal for controlling the opening and closing of the first relay 20 is transmitted through the control line 72.

The vehicle-mounted device 4 further performs opening and closing control on the second relay 30 subjected to opening and closing control by the vehicle-mounted ECU 2, thereby functioning as a control takeover ECU that takes over control to be performed by the vehicle-mounted ECU 2 on the vehicle-mounted load 3.

A control line 72 extends from the vehicle-mounted device 4 to the second relay 30, and a signal for controlling the opening and closing of the second relay 30 is transmitted through the control line 72. That is, two systems of control lines 72 are connected to the second relay 30, namely, the control line 72 extending from the vehicle-mounted ECU 2 and the control lines 72 extending from the vehicle-mounted device 4. The two systems of control lines 72 provide a redundant configuration for the second relay 30.

The vehicle-mounted device 4 and the integrated ECU 1 constantly receive supply of power from the power source device 7 such as a battery mounted in the vehicle C, and therefore constantly receive supply of power from a so-called +B power source. In contrast, the vehicle-mounted load 3 and the vehicle-mounted ECU 2 that controls the vehicle-mounted load 3 are each connected to the power source device 7 via a relay such as the first relay 20 or the second relay 30, and receive supply of power when the relay is closed (switched on). In this embodiment, the vehicle-mounted device 4 and the integrated ECU 1 constantly receive supply of power from the power source device 7, but there is no limitation to this. For example, the power supply may be temporarily stopped (non-powered state) when replacing the battery or when starting or ending initialization processing or diagnostic (self-diagnosis) processing in these devices. That is, the vehicle-mounted device 4 need only have a period during which it is in a powered state (started-up state) while the vehicle-mounted ECU 2 is in a non-powered state.

Among the various vehicle-mounted loads 3, for example, a door lock mechanism including a driving component such as a door lock motor drives the door lock in response to an operation by an occupant from outside the vehicle even when the vehicle C is stopped. When the vehicle-mounted ECU 2 that controls the door lock mechanism (vehicle-mounted load 3) is stopped (in the non-powered state), that is, in the non-started-up state, there is a concern that the time required to start up the vehicle-mounted ECU 2 (start-up time) in response to such a door lock drive request may result in a processing delay. In contrast, in this embodiment, the vehicle-mounted device 4 that constantly receives supply of power from the power source device 7 takes over for the vehicle-mounted ECU 2 in the non-started-up state or the starting-up state in response to a drive request. This makes it possible to ensure the immediacy or responsiveness required for control of the vehicle-mounted load 3 such as a door lock mechanism, without being influenced by a delay due to the start-up time of the vehicle-mounted ECU 2.

In the present embodiment, the vehicle-mounted ECU 2 (individual ECU) is described as controlling one vehicle-mounted load 3, but there is no limitation thereto, and the vehicle-mounted ECU 2 may control a plurality of vehicle-mounted loads 3. In this case, control lines 72 respectively extend from the vehicle-mounted ECU 2 to the second relays 30 connected to the vehicle-mounted loads 3. Control lines 72 also extend from the vehicle-mounted device 4 that takes over for the vehicle-mounted ECU 2 to the respective second relays 30 connected to the vehicle-mounted loads 3. Alternatively, control lines 72 may extend from the vehicle-mounted device 4 to only the second relays 30 connected to vehicle-mounted loads 3 having an ASIL (Automotive Safety Integrity Level) of a predetermined level or higher, and the vehicle-mounted device 4 may take over only the control to be performed by the vehicle-mounted ECU 2 on these vehicle-mounted loads 3 having an ASIL of the predetermined level or higher. Compared to the case where the control lines 72 extend from the vehicle-mounted device 4 to all of the vehicle-mounted loads 3, by extending the control lines 72 to only the second relays 30 of the vehicle-mounted loads 3 having ASILs other than QM (vehicle-mounted loads 30 having an ASIL of A or higher), for example, it is possible to reduce the number of components and the weight of the vehicle C while enhancing compliance with the safety requirements of the vehicle C.

The integrated ECU 1 generates control signals based on data transmitted from various ECUs such as the comparison ECU 5, the vehicle-mounted ECU 2 (individual ECU, control ECU), and the vehicle-mounted device 4 (power source management ECU, control takeover ECU), and outputs the generated control signals to the corresponding ECUs. The integrated ECU 1 is, for example, a central control device such as a vehicle computer. The integrated ECU 1 includes a control unit, a storage unit, an input/output I/F, and an in-vehicle communication unit, similarly to the later-described vehicle-mounted device 4. The integrated ECU 1 includes a plurality of in-vehicle communication units and has a relay function for relaying data transmitted and received via the communication lines 61 respectively connected to these in-vehicle communication units, and functions, for example, as a CAN gateway, a Layer 2 Ethernet switch, or a Layer 3 Ethernet switch.

The comparison ECU 5 constantly receives supply of power from the power source device 7, similarly to the integrated ECU 1 and the vehicle-mounted device 4, and a sensor 51, such as a touch sensor, and an RF antenna are connected thereto. The comparison ECU 5 includes a comparison processing unit that performs processing for detecting contact with, for example, a door handle, and performs comparison processing on a signal from a smart key received by the RF antenna in response to the detection. If the result of the comparison processing is positive, the comparison ECU 5 outputs, to the integrated ECU 1, information for making a drive request to the vehicle-mounted load 3 such as a door lock mechanism (door lock motor), for example. The comparison ECU 5 includes a control unit, a storage unit, an input/output I/F, and an in-vehicle communication unit, similarly to the later-described vehicle-mounted device 4.

The vehicle-mounted device 4 includes a control unit 41, a storage unit 42, an input/output I/F 43, and an in-vehicle communication unit 44, controls the opening and closing of the first relay 20 connected to the vehicle-mounted ECU 2 (the vehicle-mounted ECU 2 that is subject to power supply control) to be started up (powered on) or stopped (powered off) in response to a control signal transmitted from the integrated ECU 1, and functions as a power source management ECU. Furthermore, when the vehicle-mounted ECU 2 is in a non-started-up state or a starting-up state, the vehicle-mounted device 4 functions as a control takeover ECU that takes over the control to be performed by the vehicle-mounted ECU 2 on the vehicle-mounted load 3.

The control unit 41 is constituted by a CPU (Central Processing Unit) or an MPU (Micro Processing Unit), and performs various types of control processing, computation processing, and the like by reading out and executing a program P (program product) and data stored in the storage unit 42 in advance. The control unit 41 is not limited to only a software processing unit that performs software processing such as a CPU, but may also include a hardware processing unit that performs various types of control processing and computation processing by processing performed by hardware such as an FPGA, ASIC, or SOC.

The storage unit 42 is constituted by a volatile memory element such as a RAM (Random Access Memory) or a non-volatile memory element such as a ROM (Read Only Memory), an EEPROM (Electrically Erasable Programmable ROM), or a flash memory, and stores, in advance, a program P (program product) and data to be referenced during processing. The program P (program product) stored in the storage unit 42 may be a program P (program product) read out from a recording medium that is readable by the vehicle-mounted device 4. The program P (program product) may also be downloaded from an external computer (not shown) connected to a communication network (not shown), and stored in the storage unit 42.

The input/output I/F 43 is a communication interface for outputting signals to the first relay 20 and the second relay 30 via the control lines 72. If the first relay 20 and the second relay 30 are FETs, PWM signals or the like to be input to the gate terminals of the FETs are output via the input/output I/F 43.

The in-vehicle communication unit 44 is, for example, an input/output interface (CAN transceiver, Ethernet PHY) using a communication protocol such as CAN (Control Area Network), CAN-FD, or Ethernet (registered trademark), and the control unit 41 mutually communicates with the integrated ECU 1 and the like connected to the vehicle-mounted network 6 via the in-vehicle communication unit 44.

The vehicle-mounted ECU 2 (individual ECU) includes a control unit 21, a storage unit 22, an input/output I/F 23, and an in-vehicle communication unit 24, similarly to the vehicle-mounted device 4. The vehicle-mounted ECU 2 performs opening and closing control of the second relay 30 connected via the control line 72 in response to a control signal (drive request) from the integrated ECU 1, thereby performing drive control of the vehicle-mounted load 3 that is the target of the drive request. Although details will be described later, the vehicle-mounted ECU 2 performs abnormality detection on the vehicle-mounted load 3 that is the target of the drive control, and stores the number of instances of detecting an abnormality and the like in the storage unit 22.

The vehicle-mounted load 3 is, for example, an actuator such as a door lock mechanism (door lock motor) including a driving part such as a motor. The vehicle-mounted load 3 is connected to the power source device 7 via the electric wire 71, and the electric wire 71 is provided with the second relay 30. The vehicle-mounted load 3 is subjected to drive control such as driving or stopping by the vehicle-mounted ECU 2 or the vehicle-mounted device 4 performing opening and closing control of the second relay 30. The vehicle-mounted load 3 may include various sensors such as LiDAR (Light Detection and Ranging), light sensors, CMOS cameras, and infrared sensors, as well as actuators such as switches such as door switches and lamp switches, lamps, door opening and closing devices, and motor devices.

The power source device 7 is, for example, a lead battery that outputs a voltage of 12 V (+B). Alternatively, the power source device 7 may include a DC-DC converter or regulator that steps down the voltage output from a high-voltage battery such as a lithium-ion battery or an alternator to a predetermined voltage such as 12 V.

Figure 3:
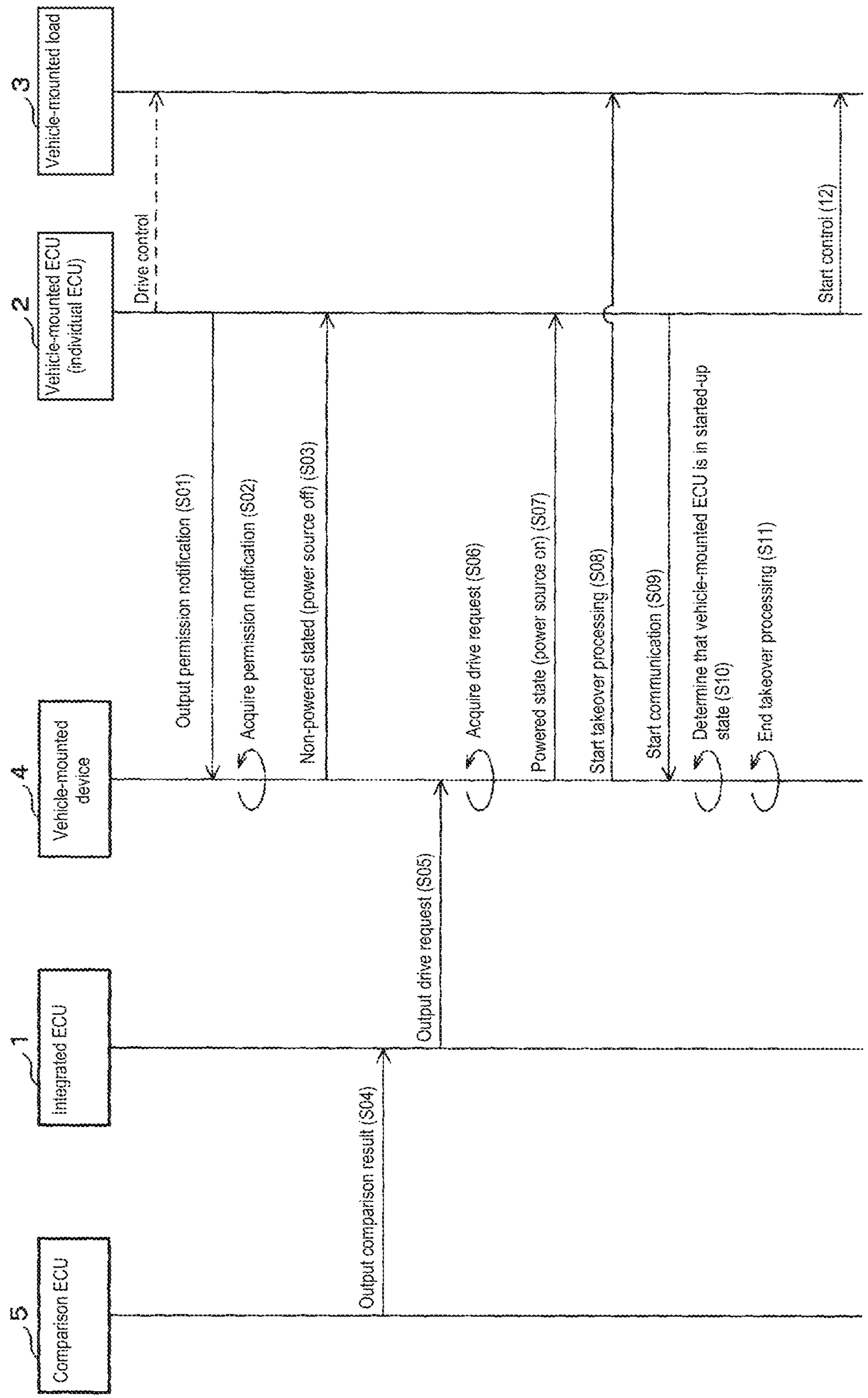

FIG. 3 is an explanatory diagram illustrating a flow (sequence) of processing performed by the vehicle-mounted device 4, the vehicle-mounted ECU 2, and the like. The integrated ECU 1, the vehicle-mounted ECU 2 (individual ECU), and the vehicle-mounted device 4 (power management ECU) included in the vehicle-mounted system S are communicably connected via the vehicle-mounted network 6, and perform the following processing in association with each other.

The vehicle-mounted ECU 2 outputs a permission notification regarding redundant control (step S01). When the vehicle C is in a started-up state, the vehicle-mounted ECU 2 acquires (receives) a control signal (a drive request to the vehicle-mounted load 3) output (transmitted) from the integrated ECU 1, and performs drive control of the vehicle-mounted load 3 connected to the vehicle-mounted ECU 2 itself in response to the drive request. When performing drive control of the vehicle-mounted load 3, the vehicle-mounted ECU 2 performs opening and closing control of the second relay 30 provided on the electric wire 71 extending from the power source device 7 to the vehicle-mounted load 3.

The vehicle-mounted ECU 2 outputs a permission notification regarding the redundant control to the vehicle-mounted device 4, for example, periodically, or when data indicating that the vehicle C will be in a stopped (sleep) state, such as an IG off signal, is received from the integrated ECU 1. The permission notification is a notification that permits the vehicle-mounted device 4 to take over the control to be performed by the vehicle-mounted ECU 2 itself on the vehicle-mounted load 3. If the vehicle-mounted ECU 2 performs drive control of a plurality of vehicle-mounted loads 3, the permission notification may list the plurality of vehicle-mounted loads 3 and include information such as flag values indicating whether or not takeover is permitted for each vehicle-mounted load 3 (1: takeover permitted, 0: takeover not permitted).

The vehicle-mounted ECU 2 does not output a permission notification for a vehicle-mounted load 3 that has failed, a vehicle-mounted load 3 for which takeover processing is not appropriate from a security standpoint, or the like, in vehicle-mounted loads 3 that are to be controlled by the vehicle-mounted ECU 2 itself. This allows the vehicle-mounted ECU 2 to set any of the vehicle-mounted loads 3 as excluded from takeover processing by the vehicle-mounted device 4, thereby preventing the vehicle-mounted device 4 from taking over control of a vehicle-mounted load 3 for which takeover processing is not appropriate.

The vehicle-mounted device 4 receives the permission notification transmitted from the vehicle-mounted ECU 2 (step S02). The vehicle-mounted device 4 acquires the permission notification transmitted from the vehicle-mounted ECU 2 and stores the acquired permission notification in the storage unit 42. If the vehicle-mounted device 4 performs processing on behalf of a plurality of vehicle-mounted ECUs 2, the vehicle-mounted device 4 may associate identification information of the vehicle-mounted ECUs 2 that transmitted the permission notification with the respective permission notifications acquired from the vehicle-mounted ECUs 2 and store the result in the storage unit 42. Furthermore, when storing the permission notification, the vehicle-mounted device 4 may store the permission notification in association with time information indicating the date and time (time stamp) when the permission notification was acquired.

The vehicle-mounted device 4 may collect the permission notifications obtained in this manner from the plurality of vehicle-mounted ECUs 2 and store them in the storage unit 42, for example, in a table format (permission notification management table). In this way, by collecting information indicating whether or not there is permission for each vehicle-mounted load 3 controlled by each vehicle-mounted ECU 2 in the permission notification management table and updating and managing the table to contain the latest information, the vehicle-mounted device 4 can efficiently manage whether or not it is possible to take over each vehicle-mounted load 3. The vehicle-mounted device 4 may store, in the storage unit 42, the permission notification management table including state information indicating whether or not the vehicle-mounted ECU 2 has failed.

The vehicle-mounted device 4 puts the vehicle-mounted ECU 2 in a non-powered state (powers off the vehicle-mounted ECU 2) (step S03). If the vehicle-mounted device 4 acquires, for example, an IG off signal or a stop signal for stopping the vehicle-mounted ECU 2 (putting the vehicle-mounted ECU 2 in a non-powered state) from the integrated ECU 1, the vehicle-mounted device 4 puts the vehicle-mounted ECU 2 in a non-powered state (powers off the vehicle-mounted ECU 2). To put the vehicle-mounted ECU 2 in a non-powered state, the vehicle-mounted device 4 opens (switches off) the first relay 20 provided on the electric wire 71 extending from the power source device 7 to the vehicle-mounted ECU 2. When the first relay 20 is opened (switched off), power supply to the vehicle-mounted ECU 2 is stopped (cut off), and the vehicle-mounted ECU 2 is in a non-powered state (the vehicle-mounted ECU 2 is powered off), that is, in a stopped state (non-started-up state) in which the vehicle-mounted ECU 2 is not started up. The vehicle-mounted device 4 is constantly connected to the power source device 7 and is constantly supplied with power from the power source device 7 (constantly receives supply of power), and therefore the vehicle-mounted device 4 remains in a started-up state even when the vehicle C is in a stopped (sleep) state.

The comparison ECU 5 outputs a comparison result regarding a detection value detected by a sensor 51 such as a touch sensor to the integrated ECU 1 (step S04). The comparison ECU 5 is also constantly supplied with power from the power source device 7 (constantly receives supply of power), similarly to the vehicle-mounted device 4 or the integrated ECU 1, and therefore maintains a started-up state even when the vehicle C is in a stopped (sleep) state. A sensor 51 such as a touch sensor and an RF antenna are connected to the comparison ECU 5, and the comparison ECU 5 performs processing for detecting contact with, for example, a door handle or the like, and in response to the detection, makes a comparison regarding the signal from the smart key received by the RF antenna. If the result of the comparison processing is positive, the comparison ECU 5 outputs, to the integrated ECU 1, for example, information for making a drive request to the door lock mechanism (door lock motor).

The integrated ECU 1 outputs a drive request for the vehicle-mounted load 3 according to the comparison result output from the comparison ECU 5 (step S05). The integrated ECU 1 generates a control signal (drive request) based on the information output from the comparison ECU 5, and outputs the drive request to the vehicle-mounted device 4. When outputting the drive request to the vehicle-mounted device 4, the integrated ECU 1 may output the drive request by using multicast or broadcast. By using multicast or the like in this manner, when the vehicle-mounted ECU 2 is in a started-up state, not only the vehicle-mounted device 4 but also the vehicle-mounted ECU 2 acquires (receives) the drive request.

The vehicle-mounted device 4 acquires the drive request output from the integrated ECU 1 (step S06). The vehicle-mounted device 4 acquires the drive request output from the integrated ECU 1 and stores the acquired drive request in the storage unit 42. The drive request output from the integrated ECU 1 includes or is associated with, for example, identification information (load ID) for identifying the target vehicle-mounted load 3, and identification information (ECU ID) for the vehicle-mounted ECU 2 that performs drive control of the vehicle-mounted load 3. The vehicle-mounted device 4 can identify the vehicle-mounted ECU 2 and the vehicle-mounted load 3 that are takeover targets by referring to the drive request.

The vehicle-mounted device 4 puts the vehicle-mounted ECU 2 in a powered state (powers on the vehicle-mounted ECU 2) (step S07). The vehicle-mounted device 4 puts the vehicle-mounted ECU 2 identified based on the drive request in a powered state (powers on the vehicle-mounted ECU 2). When the vehicle-mounted ECU 2 is to be put in a powered state (is to be powered on), the vehicle-mounted device 4 closes (switches on) the first relay 20. When the first relay 20 is closed (switched on), power supply to the vehicle-mounted ECU 2 is started, and the vehicle-mounted ECU 2 starts start-up processing such as initialization and transitions to a starting-up state.

Based on the already-acquired permission notification, the vehicle-mounted device 4 starts processing for taking over the control to be performed by the vehicle-mounted ECU 2 on the vehicle-mounted load 3 (step S08). Based on the permission notification that has already been acquired and stored in the storage unit 42 of the vehicle-mounted device 4, the vehicle-mounted device 4 starts processing for taking over the control to be performed by the vehicle-mounted ECU 2 on the vehicle-mounted load 3. The vehicle-mounted device 4 performs opening and closing control of the second relay 30 provided on the electric wire 71 extending from the power source device 7 to the vehicle-mounted load 3 that is the target of the takeover processing. As a result, the vehicle-mounted load 3 starts driving in response to the drive request. If the vehicle-mounted device 4 performs such takeover control, the vehicle-mounted device 4 stores, in the storage unit 42, history information (takeover record information) based on the number of instances of performing takeover (number of instances of takeover control) or time information (time stamp) indicating the date and time or the like when takeover was performed. If the vehicle-mounted device 4 has not received a permission notification for the vehicle-mounted load 3, the vehicle-mounted device 4 does not execute the takeover processing.

Alternatively, if the vehicle-mounted device 4 acquires information from the integrated ECU 1 indicating that the vehicle-mounted ECU 2 has failed (is in a failed state), the vehicle-mounted device 4 may start processing for taking over the control to be performed by the vehicle-mounted ECU 2 on the vehicle-mounted load 3. In this way, if the vehicle-mounted ECU 2 has failed, the vehicle-mounted device 4 may start processing for taking over the control to be performed by the vehicle-mounted ECU 2 on the vehicle-mounted load 3 even if the vehicle-mounted device 4 has not acquired a permission notification.

The vehicle-mounted ECU 2 starts communication with the vehicle-mounted device 4 (step S09). After completing start-up processing such as initialization, the vehicle-mounted ECU 2 starts communication with the vehicle-mounted device 4 and the integrated ECU 1.

The vehicle-mounted device 4 determines that the vehicle-mounted ECU 2 is in a started-up state based on the communication data acquired from the vehicle-mounted ECU 2 (step S10). After closing (switching on) the first relay 20 connected to the target vehicle-mounted ECU 2, the vehicle-mounted device 4 determines that the vehicle-mounted ECU 2 is in a started-up state by acquiring communication data such as the first CAN message from the vehicle-mounted ECU 2.

The vehicle-mounted device 4 ends the processing for taking over for the vehicle-mounted ECU 2 (step S11). After determining that the vehicle-mounted ECU 2 is in the started-up state, the vehicle-mounted device 4 ends (cancels) the processing for taking over the control to be performed by the vehicle-mounted ECU 2 on the vehicle-mounted load 3. That is, the vehicle-mounted device 4 does not execute the takeover control on the vehicle-mounted load 3 if the vehicle-mounted ECU 2 is in the started-up state. This makes it possible to prevent a conflict between the controls performed the vehicle-mounted device 4 and the vehicle-mounted ECU 2 on the vehicle-mounted load 3.

The vehicle-mounted ECU 2 starts control of the vehicle-mounted load 3 (step S12). If the control of the vehicle-mounted load 3 is taken over by the vehicle-mounted device 4 through this processing, the vehicle-mounted load 3 is driven even though the vehicle-mounted ECU 2 is not performing drive control. If the vehicle-mounted load 3 is driven through the takeover processing performed by the vehicle-mounted device 4, the vehicle-mounted ECU 2, which is about to start control of the vehicle-mounted load 3, determines that the vehicle-mounted load 3 has been driven due to a malfunction or the like, and determines that an abnormality has occurred in the vehicle-mounted load 3 (detects an abnormality). In view of this, when starting control of the vehicle-mounted load 3, the vehicle-mounted ECU 2 acquires the number of instances of takeover control and the like output from the vehicle-mounted device 4, and determines whether or not a true abnormality has occurred in the vehicle-mounted load 3 by comparing the number of instances of takeover control with the number of instances of detecting an abnormality (number of instances of abnormality detection).

For example, if the number of instances of takeover control and the number of instances of abnormality detection are the same, the vehicle-mounted ECU 2 determines that the vehicle-mounted load 3 is normal, and if the number of instances of takeover control and the number of instances of abnormality detection are different, the vehicle-mounted ECU 2 determines that the vehicle-mounted load 3 is abnormal (determines that the vehicle-mounted load 3 has failed). This makes it possible to avoid erroneously detecting the driving of the vehicle-mounted load 3 through the takeover processing of the vehicle-mounted device 4 as an abnormality in the vehicle-mounted load 3. The vehicle-mounted ECU 2 may start controlling the vehicle-mounted load 3 after determining that the vehicle-mounted load 3 is normal.

Figure 4:
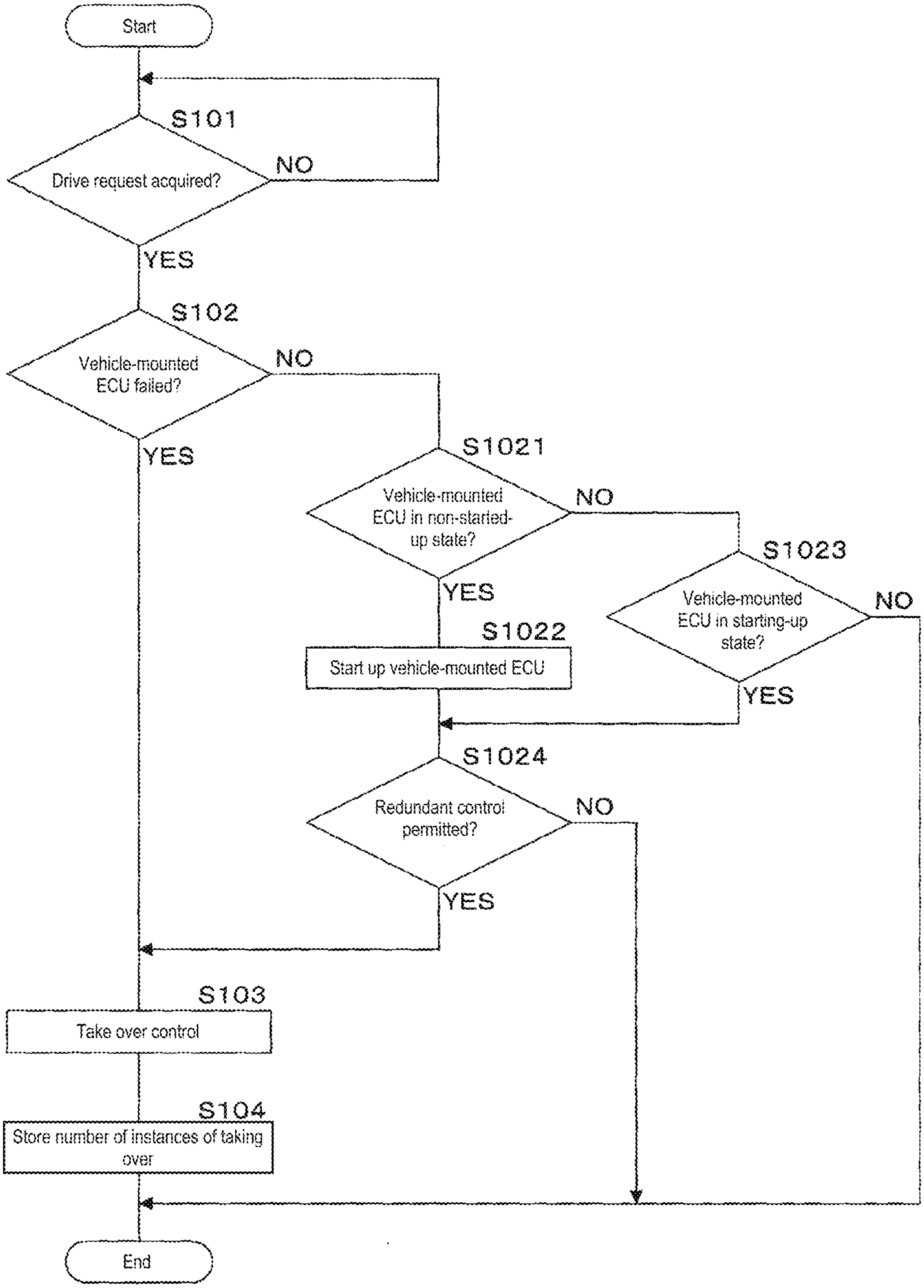
FIG. 4 is a flowchart illustrating processing performed by a control unit of the vehicle-mounted device.

FIG. 4 is a flowchart illustrating processing performed by the control unit 41 of the vehicle-mounted device 4. The vehicle-mounted device 4 (power source management ECU) steadily performs the following processing, for example, when the vehicle C is in a stopped state (IG switch is off) or in a started-up state (IG switch is on).

The control unit 41 of the vehicle-mounted device 4 determines whether or not a drive request for the vehicle-mounted load 3 has been acquired (step S101). The integrated ECU 1 generates a control signal (drive request) based on information output from the comparison ECU 5, for example, and outputs the control signal to the vehicle-mounted device 4. The control unit 41 of the vehicle-mounted device 4 performs processing for waiting for a drive request to be output from the integrated ECU 1, and when a drive request is output from the integrated ECU 1, the control unit 41 acquires the drive request. If a drive request has not been acquired (step S101: NO), the control unit 41 of the vehicle-mounted device 4 performs loop processing to execute the processing of step S101 again.

If a drive request has been acquired (step S101: YES), the control unit 41 of the vehicle-mounted device 4 determines whether or not the vehicle-mounted ECU 2 has failed (step S102). Failure information indicating whether or not each of the vehicle-mounted ECUs 2 connected to the vehicle-mounted network 6 has failed is collected, stored, updated, and centrally managed in the integrated ECU 1 by constant communication between these vehicle-mounted ECUs 2 and the integrated ECU 1. If the control unit 41 of the vehicle-mounted device 4 acquires, from the integrated ECU 1, information indicating that the vehicle-mounted ECU 2 has failed (is in a failed state), the control unit 41 determines that the vehicle-mounted ECU 2 has failed. Alternatively, the control unit 41 of the vehicle-mounted device 4 may determine whether or not the vehicle-mounted ECU 2 has failed based on the results of communication, such as polling, that was previously performed with the vehicle-mounted ECU 2.

If the vehicle-mounted ECU 2 is not in a failed state (step S102: NO), the control unit 41 of the vehicle-mounted device 4 determines whether or not the vehicle-mounted ECU 2 is in a non-started-up state (whether or not the vehicle-mounted ECU 2 is powered off) (step S1021). The control unit 41 of the vehicle-mounted device 4 determines whether the vehicle-mounted ECU 2 is in a non-started-up state (is powered off) or not (is powered on) based on whether or not a signal is being transmitted via the control line 72 to the first relay 20 that controls the power supply to the vehicle-mounted ECU 2. Alternatively, the storage unit 42 of the vehicle-mounted device 4 may store a control log of the opening and closing control (on/off control) performed on the first relay 20 of the vehicle-mounted ECU 2, and based on the control log, it may be determined whether the vehicle-mounted ECU 2 is in a non-started-up state (is powered off) or not (is powered on).

If the vehicle-mounted ECU 2 is in a non-started-up state (is powered off) (step S1021: YES), the control unit 41 of the vehicle-mounted device 4 starts up the vehicle-mounted ECU 2 (step S1022). If the vehicle-mounted ECU 2 is in a non-started-up state (is powered off), the control unit 41 of the vehicle-mounted device 4 closes (switches on) the first relay 20 connected to the vehicle-mounted ECU 2 to start up the vehicle-mounted ECU 2.

If the vehicle-mounted ECU 2 is not in a non-started-up state (is not powered off) (step S1021: NO), the control unit 41 of the vehicle-mounted device 4 determines whether or not the vehicle-mounted ECU 2 is in a starting-up state (step S1023). If the vehicle-mounted ECU 2 is not in a non-started-up state (is not powered off), that is, if the control unit 41 of the vehicle-mounted device 4 has already closed (switched on) the first relay 20 connected to the vehicle-mounted ECU 2, the control unit 41 determines whether or not the vehicle-mounted ECU 2 is in a starting-up state based on whether or not first communication data, such as a CAN message, has been acquired from the vehicle-mounted ECU 2 after the first relay 20 is closed (switched on).

If the control unit 41 of the vehicle-mounted device 4 has not acquired the first communication data, the control unit 41 determines that the vehicle-mounted ECU 2 is, for example, performing initialization processing and is in a starting-up state. If the control unit 41 of the vehicle-mounted device 4 has acquired the first communication data, the control unit 41 determines that the vehicle-mounted ECU 2 is not in a starting-up state, that is, the vehicle-mounted ECU is in a started-up state.

If the vehicle-mounted ECU 2 is in the starting-up state (step S1023: YES), or after the processing of step S1022 is executed, the control unit 41 of the vehicle-mounted device 4 determines whether or not redundant control is permitted (step S1024). If the vehicle-mounted ECU 2 is in a starting up state, or immediately after the vehicle-mounted ECU 2 is started up, the control unit 41 of the vehicle-mounted device 4 determines whether or not permission for redundant control (permission notification) has been acquired from the vehicle-mounted ECU 2.

The vehicle-mounted ECU 2 outputs a permission notification regarding redundant control to the vehicle-mounted device 4, for example, periodically, or when data indicating that the vehicle C will be in a stopped (sleep) state, such as an IG off signal, is acquired from the integrated ECU 1. The control unit 41 of the vehicle-mounted device 4 acquires the permission notification transmitted from the vehicle-mounted ECU 2 and stores the acquired permission notification in the storage unit 42 of the vehicle-mounted device 4. Accordingly, the control unit 41 of the vehicle-mounted device 4 refers to the storage unit 42 of the vehicle-mounted device 4 to determine whether or not permission (permission notification) for redundant control has been acquired in advance from the vehicle-mounted ECU 2.

If redundant control is permitted (step S1024: YES) or if the vehicle-mounted ECU 2 is in a failed state (step S102: YES), the control unit 41 of the vehicle-mounted device 4 takes over the control to be performed by the vehicle-mounted ECU 2 on the vehicle-mounted load 3 (step S103). If redundant control is permitted (if a permission notification has been acquired) or if the vehicle-mounted ECU 2 is in a failed state, the control unit 41 of the vehicle-mounted device 4 takes over the control to be performed by the vehicle-mounted ECU 2 on the vehicle-mounted load 3 by performing opening and closing control of the second relay 30 of the vehicle-mounted load 3 that is the target of the drive request.

The control unit 41 of the vehicle-mounted device 4 stores the number of instances of taking over the control to be performed by the vehicle-mounted ECU 2 on the vehicle-mounted load 3 (step S104). When the control unit 41 of the vehicle-mounted device 4 takes over the control to be performed by the vehicle-mounted ECU 2 on the vehicle-mounted load 3, the control unit 41 stores, in the storage unit 42 of the vehicle-mounted device 4, history information (takeover record information) based on, for example, the number of instances of performing takeover (number of instances of takeover control) or time information (time stamp) indicating the date and time when takeover was performed. The control unit 41 of the vehicle-mounted device 4 outputs (transmits), to the vehicle-mounted ECU 2, information regarding the number of instances of performing takeover (number of instances of takeover control).

If redundant control is not permitted (step S1024: NO), if the vehicle-mounted ECU 2 is not in a starting-up state (step S1023: NO), that is, if the vehicle-mounted ECU 2 is in a started-up state, or after executing the processing of step S104, the control unit 41 of the vehicle-mounted device 4 ends the series of processing in this flow. Alternatively, the control unit 41 of the vehicle-mounted device 4 may perform loop processing to execute the processing from step S101 again if redundant control is not permitted (step S1024: NO), if the vehicle-mounted ECU 2 is not in a starting-up state (step S1023: NO), or after executing the processing of step S104.

Figure 5:
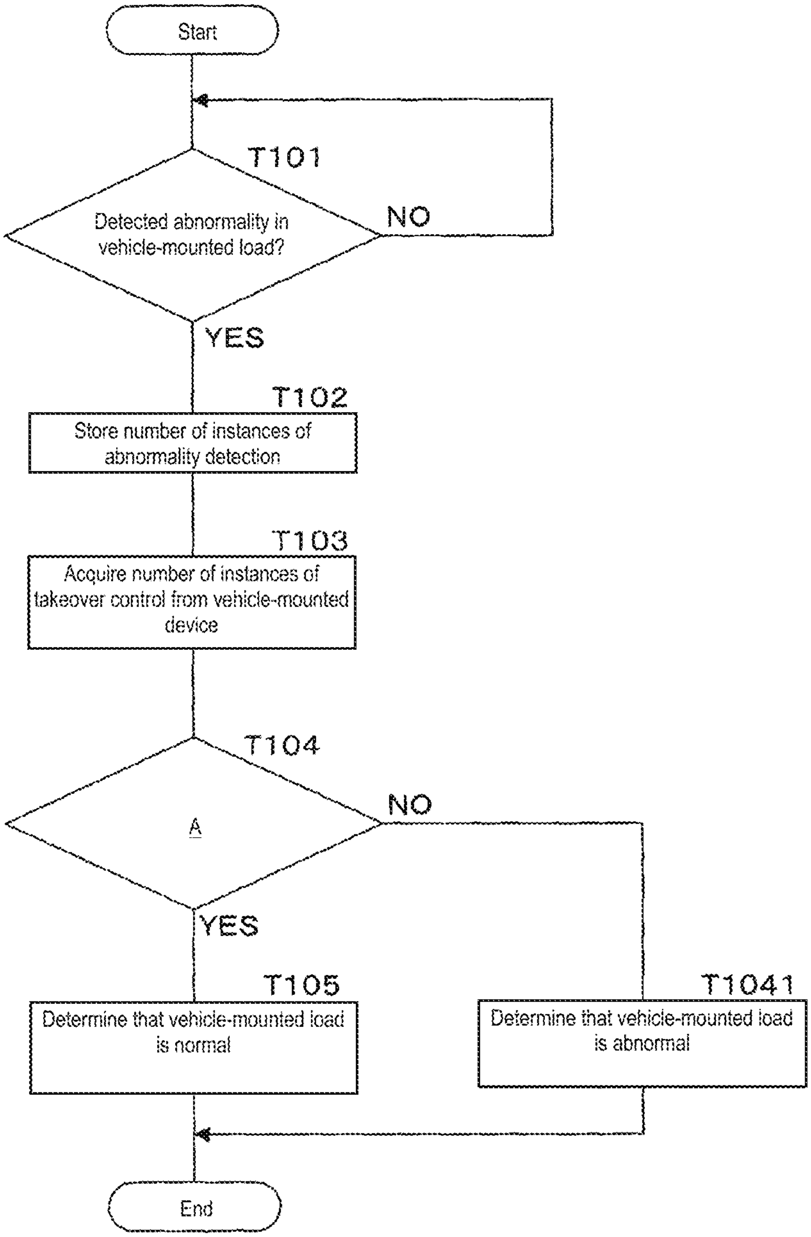
FIG. 5 is a flowchart illustrating processing (detection of failure of a vehicle-mounted load) performed by the control unit of the vehicle-mounted ECU.

FIG. 5 is a flowchart illustrating processing (failure detection of the vehicle-mounted load 3) of the control unit 21 of the vehicle-mounted ECU 2. The vehicle-mounted ECU 2 (individual ECU) steadily performs the following processing, for example, when the vehicle C is in a started-up state (IG switch is on).

The control unit 21 of the vehicle-mounted ECU 2 determines whether or not an abnormality in the vehicle-mounted load 3 has been detected (step T101). For example, after completing the initialization processing performed during start-up, the control unit 21 of the vehicle-mounted ECU 2 attempts to detect an abnormality in the vehicle-mounted load 3 to be driven by outputting a test signal to the second relay 30 connected to the vehicle-mounted load 3. The control unit 21 of the vehicle-mounted ECU 2 may detect whether or not there is an abnormality in the vehicle-mounted load 3 based on the output result of the test signal.

If no abnormality is detected in the vehicle-mounted load 3 (step T101: NO), loop processing is performed to execute the processing of step T101 again. If no abnormality is detected in the vehicle-mounted load 3, the control unit 21 of the vehicle-mounted ECU 2 may determine that the vehicle-mounted load 3 is normal and store the determination result in the storage unit 22 of the vehicle-mounted ECU 2. If an abnormality in the vehicle-mounted load 3 is detected (step T101: YES), the control unit 21 of the vehicle-mounted ECU 2 stores the number of instances of detecting an abnormality (the number of instances of abnormality detection) (step T102). If an abnormality in the vehicle-mounted load 3 is detected, the control unit 21 of the vehicle-mounted ECU 2 stores, in the storage unit 22 of the vehicle-mounted ECU 2, the number of instances of detecting an abnormality (the number of instances of abnormality detection) up to the present time or within a predetermined period.

The control unit 21 of the vehicle-mounted ECU 2 acquires the number of instances of takeover control from the vehicle-mounted device 4 (step T103). The control unit 21 of the vehicle-mounted ECU 2 acquires, from the vehicle-mounted device 4, information regarding the number of instances when the vehicle-mounted device 4 took over for the target vehicle-mounted load 3, that is, the vehicle-mounted load 3 corresponding to the number of instances of abnormality detection (number of instances of takeover control). The control unit 21 of the vehicle-mounted ECU 2 stores the acquired number of instances of takeover control in the storage unit 22 of the vehicle-mounted ECU 2.

The control unit 21 of the vehicle-mounted ECU 2 determines whether or not the number of instances of abnormality detection matches the number of instances of takeover control (step T104). If it is determined that they match (step T104: YES), the control unit 21 of the vehicle-mounted ECU 2 determines that the vehicle-mounted load 3 is normal (step T105). If it is determined that they do not match (step T104: NO), the control unit 21 of the vehicle-mounted ECU 2 determines that the vehicle-mounted load 3 is abnormal (failure determination) (step T1041). In this embodiment, failure determination is performed based on the result of determining whether or not the number of instances of abnormality detection matches the number of instances of takeover control, but there is no limitation to this. The control unit 21 of the vehicle-mounted ECU 2 may perform failure determination by communicating with the vehicle-mounted device 4 and receiving a notification from the vehicle-mounted device 4 regarding whether or not takeover control (control offloading) has been performed.

Second Embodiment

Figure 6:
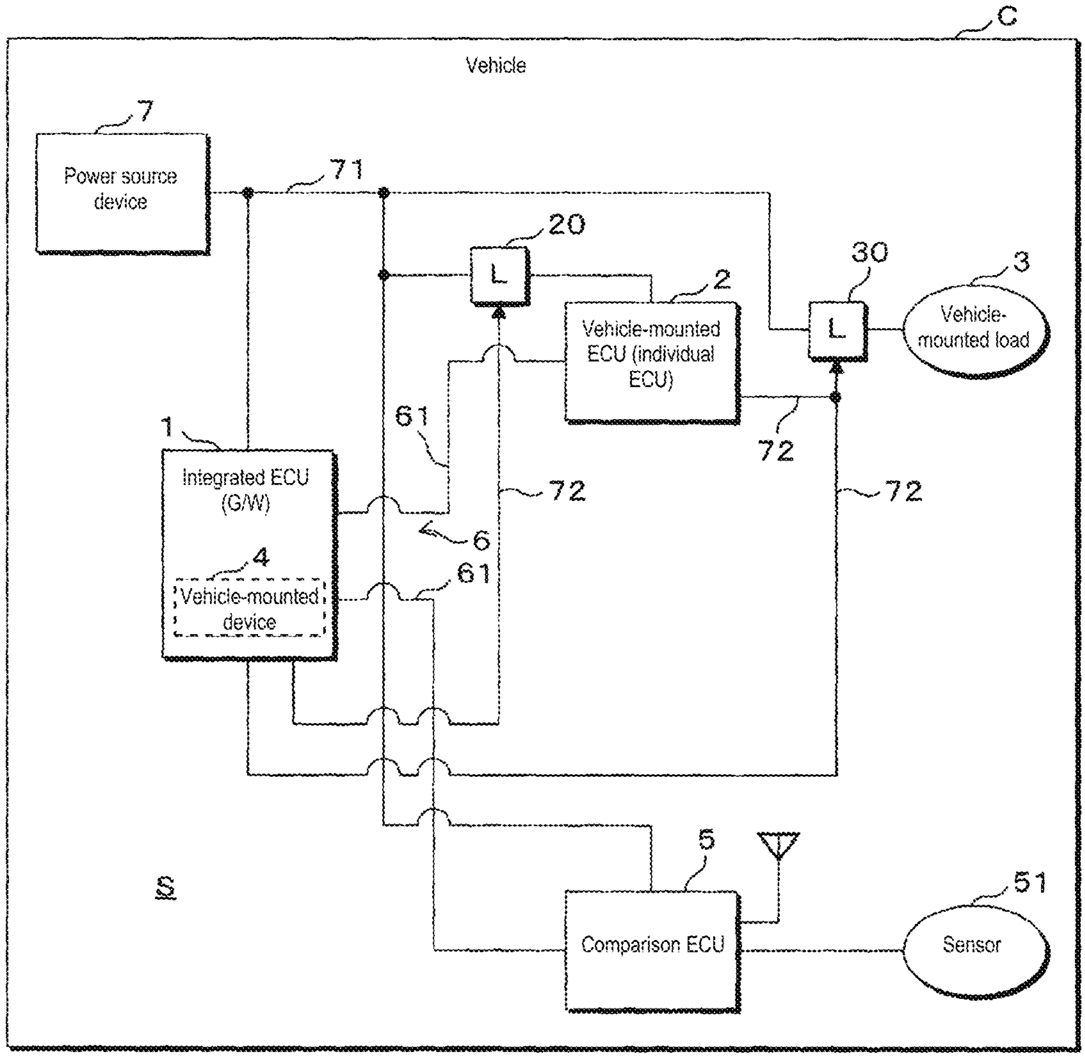
FIG. 6 is a schematic diagram illustrating a system configuration of a vehicle-mounted system according to a second embodiment (integrated ECU).

FIG. 6 is a schematic diagram illustrating a system configuration of a vehicle-mounted system S according to a second embodiment (integrated ECU 1). In this embodiment, a vehicle-mounted device 4 that functions as a power supply management ECU and a takeover control ECU is included in the integrated ECU 1. When the vehicle-mounted device 4 is included in the integrated ECU 1, the vehicle-mounted device 4 may be configured as one functional part of the integrated ECU 1. Control lines 72 respectively extend from the integrated ECU 1 including the vehicle-mounted device 4 to the first relay 20 and the second relay 30. Similarly to the first embodiment, the integrated ECU 1 including the vehicle-mounted device 4 controls the power supply to the vehicle-mounted ECU 2 by performing opening and closing control of the first relay 20, and takes over the control to be performed by the vehicle-mounted ECU 2 on the vehicle-mounted load 3 by performing opening and closing control of the second relay 30.

The integrated ECU 1 generates a drive request for the vehicle-mounted load 3 based on communication with the comparison ECU 5, and collects failure information indicating whether the vehicle-mounted ECU 2 has failed. In addition, the integrated ECU 1 is also responsible for the functions related to power source management and takeover control performed by the vehicle-mounted device 4, thereby enabling the integrated ECU 1 to efficiently perform takeover processing according to the state of each vehicle-mounted ECU 2.

The embodiments disclosed herein are to be considered in all respects as illustrative and not restrictive. The scope of the present disclosure is defined not by the above meaning but by the claims, and all modifications within the meaning and scope equivalent to the claims are intended to be encompassed therein.

The invention claimed is:

1. A vehicle-mounted device that is communicably connected to a vehicle-mounted ECU configured to perform control of a vehicle-mounted load to be mounted in a vehicle, the vehicle-mounted device receiving supply of power from a power source device mounted in the vehicle, the vehicle-mounted device comprising:

a control unit configured to control power supply to the vehicle-mounted ECU, wherein the control unit takes over control to be performed by the vehicle-mounted ECU on the vehicle-mounted load, according to a state of the vehicle-mounted ECU, the power source device and the vehicle-mounted ECU are connected to each other via a first relay, the power source device and the vehicle-mounted load are connected to each other via a second relay subjected to opening and closing control by the vehicle-mounted ECU, the control unit performs control of power supply to the vehicle-mounted ECU by performing opening and closing control of the first relay, and takes over the control to be performed by the vehicle-mounted ECU on the vehicle-mounted load by performing opening and closing control of the second relay, control lines that are made redundant due to respectively extending from the vehicle-mounted ECU and the vehicle-mounted device are connected to the second relay, and the redundant control lines are respectively connected to the same portion of the second relay, wherein the control unit acquires a drive request for the vehicle-mounted load, and takes over the control to be performed by the vehicle-mounted ECU on the vehicle-mounted load, in response to the acquired drive request.

2. The vehicle-mounted device according to claim 1, wherein the state of the vehicle-mounted ECU includes a non-started-up state, a starting-up state, and a started-up state, and the control unit takes over the control to be performed by the vehicle-mounted ECU on the vehicle-mounted load when the state of the vehicle-mounted ECU is the non-started-up state or the starting-up state.

3. The vehicle-mounted device according to claim 1, wherein if the control unit acquires a permission notification permitting takeover of control of the vehicle-mounted load from the vehicle-mounted ECU, the control unit takes over the control to be performed by the vehicle-mounted ECU on the vehicle-mounted load.

4. The vehicle-mounted device according to claim 1, wherein when the control unit takes over the control to be performed by the vehicle-mounted ECU on the vehicle-mounted load, the control unit outputs information indicating that takeover has been performed to the vehicle-mounted ECU.

5. The vehicle-mounted device according to claim 1, wherein the state of the vehicle-mounted ECU includes a failed state, and the control unit takes over the control to be performed by the vehicle-mounted ECU on the vehicle-mounted load when the state of the vehicle-mounted ECU is the failed state.

6. The vehicle-mounted device according to claim 1, wherein an integrated ECU configured to perform overall control of the vehicle is mounted in the vehicle, and the vehicle-mounted device is configured as a functional part of the vehicle-mounted ECU.

7. The vehicle-mounted device according to claim 1, wherein power is constantly supplied from the power source device.

8. An information processing method for causing a computer that is communicably connected to a vehicle-mounted ECU configured to perform control of a vehicle-mounted load to be mounted in a vehicle, and that receives supply of power from a power source device mounted in the vehicle, to execute the following processing:

executing processing related to control of power supply to the vehicle-mounted ECU; and taking over control to be performed by the vehicle-mounted ECU on the vehicle-mounted load, according to a state of the vehicle-mounted ECU, wherein the power source device and the vehicle-mounted ECU are connected to each other via a first relay, the power source device and the vehicle-mounted load are connected to each other via a second relay subjected to opening and closing control by the vehicle-mounted ECU, the computer further executes the following processing:

performing control of power supply to the vehicle-mounted ECU by performing opening and closing control of the first relay; and taking over the control to be performed by the vehicle-mounted ECU on the vehicle-mounted load by performing opening and closing control of the second relay, control lines that are made redundant due to respectively extending from the vehicle-mounted ECU and the vehicle-mounted device are connected to the second relay, and the redundant control lines are respectively connected to the same portion of the second relay, acquires a drive request for the vehicle-mounted load; and takes over the control to be performed by the vehicle-mounted ECU on the vehicle-mounted load, in response to the acquired drive request.

9. A computer program product for causing a computer that is communicably connected to a vehicle-mounted ECU configured to perform control of a vehicle-mounted load to be mounted in a vehicle, and that receives supply of power from a power source device mounted in the vehicle, the computer program product comprising a non-transitory, machine-readable medium storing instructions which, when executed by at least one programmable processor of the computer, causes at least one programmable processor to execute the following processing:

executing processing related to control of power supply to the vehicle-mounted ECU; and taking over control to be performed by the vehicle-mounted ECU on the vehicle-mounted load, according to a state of the vehicle-mounted ECU, the power source device and the vehicle-mounted ECU are connected to each other via a first relay, the power source device and the vehicle-mounted load are connected to each other via a second relay subjected to opening and closing control by the vehicle-mounted ECU, the computer further executes the following processing:

performing control of power supply to the vehicle-mounted ECU by performing opening and closing control of the first relay, and taking over the control to be performed by the vehicle-mounted ECU on the vehicle-mounted load by performing opening and closing control of the second relay, and control lines that are made redundant due to respectively extending from the vehicle-mounted ECU and the vehicle-mounted device are connected to the second relay, the redundant control lines are respectively connected to the same portion of the second relay;

acquires a drive request for the vehicle-mounted load; and takes over the control to be performed by the vehicle-mounted ECU on the vehicle-mounted load, in response to the acquired drive request.

* * * * *